United States Patent [19]
Petersen et al.

[11] Patent Number: 5,215,117
[45] Date of Patent: Jun. 1, 1993

[54] DOUBLE-CHECK FILLER VALVE

[75] Inventors: James A. Petersen, Greensboro; Herbert L. Flanigan, Graham; F. David Zeiss, Greensboro, all of N.C.

[73] Assignee: Engineered Controls International, Inc., Greensboro, N.C.

[21] Appl. No.: 763,297

[22] Filed: Sep. 20, 1991

[51] Int. Cl.[5] .............................................. F16K 15/03
[52] U.S. Cl. ................... 137/512.3; 137/527.6
[58] Field of Search .................. 137/512.3, 527, 527.6

[56] References Cited

U.S. PATENT DOCUMENTS

| | | | |
|---|---|---|---|
| 3,283,778 | 11/1966 | Linna | 137/512.3 |
| 3,542,063 | 11/1970 | Etter | 137/512.3 |
| 4,259,983 | 4/1981 | Kessel | |
| 4,269,215 | 5/1981 | Odar | |

*Primary Examiner*—Robert G. Nilson
*Attorney, Agent, or Firm*—Sixbey, Friedman, Leedom & Ferguson

[57] ABSTRACT

A double-check valve assembly including a single valve body which is threadingly insertable within a filler opening of a storage tank. Specifically, the check valve includes an upper check valve, a lower check valve and a free floating valve guide including means for controlling the operation of both upper and lower check valves. The valve guide is formed as a separate element and fits within the valve body and is preferably provided with a guide for the upper check valve and a pivot for the lower check valve. Moreover, the lower check valve is preferably eccentrically pivotally mounted on the valve guide. The valve guide is preferably spring biased in the direction opposite fluid flow to initially resist such flow. The valve assembly is designed such that fluid pressure acting on the double-check valve assembly during filling of the tank opens the upper check valve initially and then opens the lower check valve while displacing the free floating valve guide. The double-check valve assembly of the present invention includes a single valve body within which the double-check valve is provided so as to reduce leakage paths, while at the same time providing a device wherein the upper check valve can be easily serviced or replaced as necessary.

13 Claims, 4 Drawing Sheets

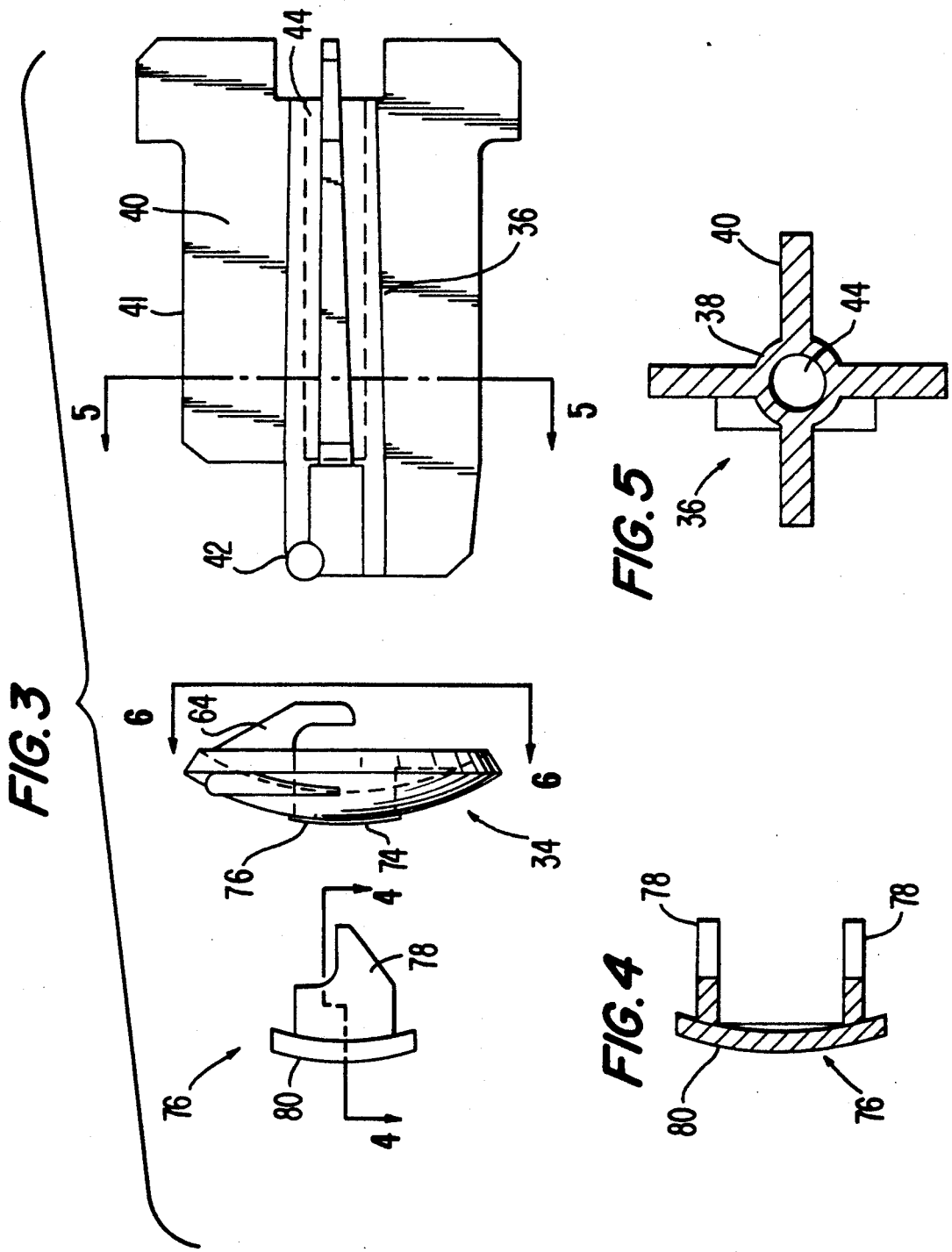

DOUBLE-CHECK FILLER VALVE

TECHNICAL FIELD

The present invention relates generally to check valves, and more particularly to a valve construction comprising two check valves arranged serially within a valve body with an improved valve guide for facilitating opening and closing of both check valves.

BACKGROUND OF THE INVENTION

Check valves of various designs for many specific uses are generally well known. Moreover, in certain industries where the provision of a leak-proof closure from a vessel is essential, double-check valves have become accepted and, in fact, have become the standard in the industry for that reason.

One industry within which such double-check valves have become the standard is in the handling of liquified gases, and more particularly, in the liquid propane service industry. Liquid propane or LP gas is usually stored in vessels or tanks of various capacities depending on customer usage. In many cases, the tanks are filled from tank trucks or the like having a large storage capacity.

The present invention is particularly applicable to the storage tanks at the customer use facilities, and particularly relates to use within the filler of such a tank. Within the tank filler, the double-check valve is typically situated to ensure leak-proof closure of the tank and to facilitate easy filling of the tank by transfer of LP gas from the tank truck to the storage tank. Such double-check valves practically guarantee leak-proof closure by providing a double-sealing device which preferably also is accessible so that the check valves can be replaced or serviced if necessary. The safety provided by such double-check valves definitely justifies the additional cost of a double-check valve as compared with that of a single-check valve.

Even though the additional costs for a double-check valve are justified by safety, it is desirable to provide as effective a double-check valve as possible while reducing the production costs thereof. Additionally, it is particularly desirable to keep manufacturing costs down and to provide a double-check valve that ensures a leak-proof closure and does not adversely reduce filling weights by causing turbulence of the LP gas through the valve device.

One example of a double-check valve known to the prior art is shown and described in U.S. Pat. No. 3,283,778 patented Nov. 8, 1966 to E. W. Linna. The Linna patent discloses a double-check valve including an upper stem valve of fairly typical check valve construction and a lower check valve that pivots about an eccentric axis so as to maximize flow by improving flow characteristics. The major disadvantage of the Linna type check valve is the production costs associated with the particular design and the relative complexity involved in guiding the upper and lower check valves. Moreover, the construction requires a two-piece valve body which further disadvantageously provides additional leak paths.

In order to guide the upper and lower check valves of the Linna device, a spider is formed integrally with the valve body portion within which the upper and lower check valves are movable. This spider must be formed within the valve body portion, such as by forging or by machining, thereby increasing manufacturing costs. Moreover, precise bores must be machined within the spider itself for guiding the upper and lower check valves. Thus, many manufacturing or machining steps must be completed on the valve body portion during manufacturing. Each step, of course, adds to the manufacturing costs.

SUMMARY OF THE INVENTION

It is thus an object of the present invention to provide a double-check valve that overcomes the aforementioned disadvantages and shortcomings of prior art type double-check valves.

It is also an object of the present invention to provide an improved double-check valve which reliably and effectively ensures closure of a tank without leakage and which is economically manufactured. Moreover, it is desirable to provide a valve guide which accurately and reliably permits opening and closing of both an upper and lower check valve.

It is yet another object of the present invention to accurately and reliably allow for opening and closing of both an upper and lower check valve by providing a free floating valve guide including means for permitting the upper check valve to open and close and having a further means for permitting pivotal opening and closing of the lower check valve depending on the position of the free floating valve guide within the guide body. In this regard, the upper check valve is opened by pressure of the incoming fluid and the valve guide is also displaced responsive to the fluid pressure in such a manner that the valve guide is shifted during opening of the lower check valve.

A still further object of the present invention is to provide an improved double-check valve which operates to permit an upper check valve to open in response to pressure of incoming fluid and a lower check valve to open subsequent to the opening of the upper check valve as fluid pressure within the valve body increases. A manual operator is provided to mechanically close the upper check valve should it fail to close subsequent to closure of the lower check valve.

Yet another object of the present invention is to provide an improved double-check valve with a free floating valve guide between an upper and lower check valve. By providing a valve guide means for guiding and controlling both the upper and lower check valves, a more simplified double-check valve is made, and by using a free floating valve guide, it becomes unnecessary to provide additional machining or forging operations for the valve body, therefore greatly reducing manufacturing costs. The valve guide is formed as a separate element, fits within the valve body and is preferably provided with a guide for the upper check valve and a pivot for the lower check valve. Moreover, the lower check valve is preferably eccentrically pivotally mounted on the valve guide and the fluid pressure acting on the double-check valve assembly during filling of the tank opens the upper check valve initially and then opens the lower check valve while displacing the free floating valve guide. Furthermore, the double-check valve assembly of the present invention comprises a single valve body within which the double-check valve is provided so as to reduce leakage paths, while at the same time providing a device where the upper check valves can be easily serviced or replaced as necessary.

The aforementioned objects, features and advantages of the present invention are obtained by a double-check valve assembly comprising a valve body, which preferably is threaded into a filler opening of a storage tank, an upper check valve, a lower check valve, and a free floating valve guide including means for controlling the operation of both the upper and lower check valves. More specifically, the valve body is provided with a cavity therethrough within which the upper and lower check valves and the valve guide are provided. An upper seat ring is also provided within the valve body near its top opening against which the upper check valve can seal. The upper check valve is provided below the upper seat ring and is preferably of a typical valve stem type including a circular disc formed from a resilient material and a valve stem which extends downwardly from the valve. The valve stem is slidably retained within a central bore of the valve guide and a spring is provided between the valve guide and the valve disc to bias the upper check valve against the upper seat ring. The valve guide is also preferably spring biased in the same direction as the upper check valve and includes a transverse pin at its lower edge onto which the lower check valve is pivotally mounted. The valve guide is designed to provide minimal resistance to fluid flow therethrough by including radial vanes extending outwardly from a central portion including the guide cavity for the upper check valve so as to only minimally affect fluid flow. Preferably, four such radial vanes are provided. Furthermore, the transverse pin for the lower check valve is preferably eccentrically located such that when the lower check valve is opened it moves toward one side of the valve body to advantageously reduce its effect on the fluid flow therethrough. The lower check valve is preferably also circular and is connected to the transverse pin at the bottom of the valve guide by a plurality of pivot arms formed integrally with the lower check valve and a locking key sealably connected to the lower check valve and including lock arms which trap the transverse pin with the pivot arms.

These and further objects, features and advantages of the present invention will become more apparent from the following description when taken in conjunction with the accompanying drawings which show, for the purposes of illustration only, a preferred embodiment in accordance with the present invention.

BRIEF DESCRIPTION OF THE DRAWINGS

FIG. 3 is an exploded view of the valve guide, lower check valve and locking key of the present invention;

FIG. 4 is a cross sectional view taken along the plane indicated by line 4—4 in FIG. 3;

FIG. 5 is a cross sectional view taken along line 5—5 in FIG. 3;

DETAILED DESCRIPTION OF THE PREFERRED EMBODIMENT

Figure 1:
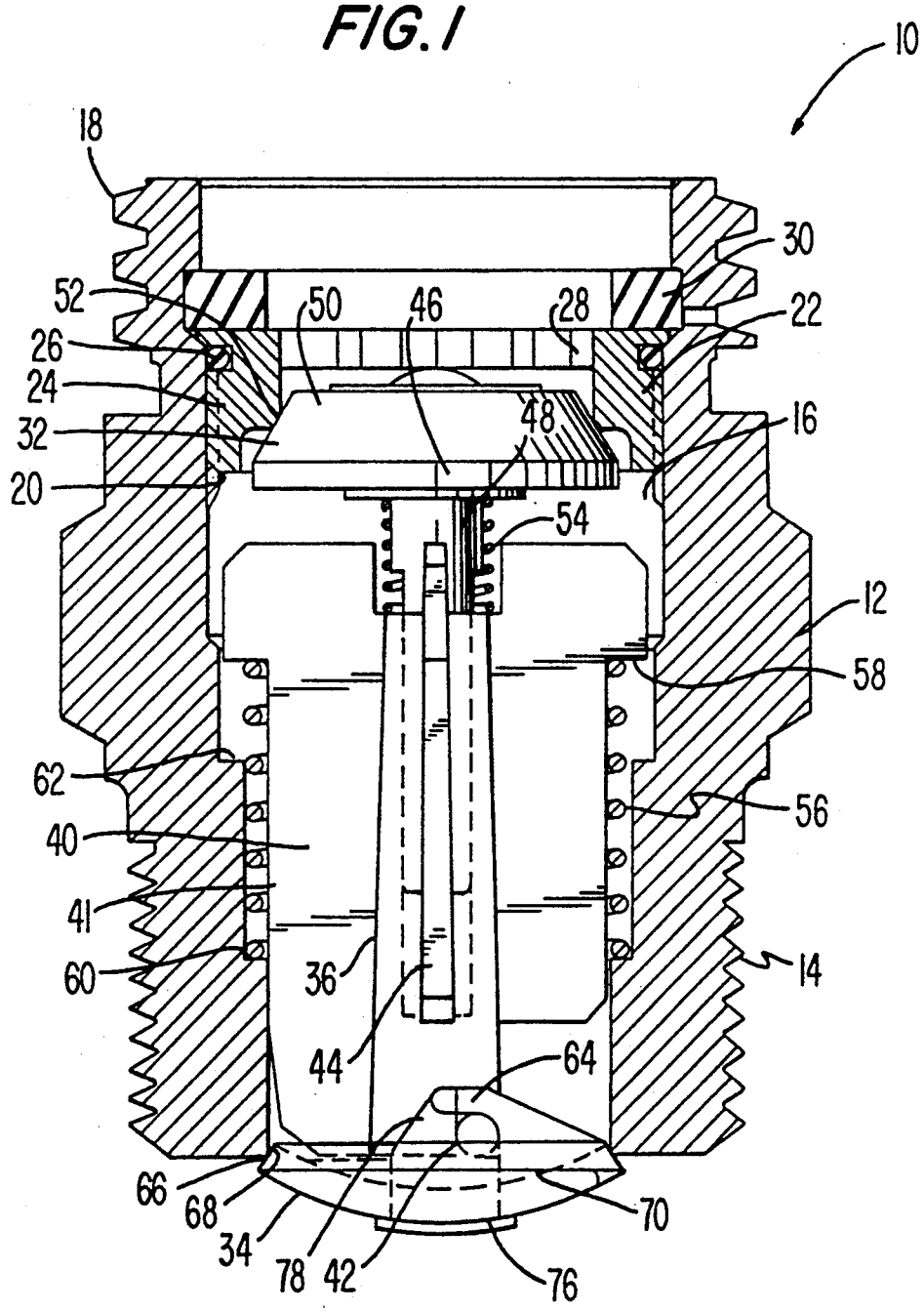
FIG. 1 is a partial cross section of the double-check valve assembly of the present invention with the upper and lower check valves in closed positions.

Referring now to the figures and in particular to FIG. 1, a double-check valve assembly 10 is illustrated. It should be understood that the double-check valve assembly 10 is particularly applicable as a double-check valve provided in the inlet of a storage tank for handling liquified gases such as liquid propane (LP), and further that the double-check valve assembly 10 of the present invention could be used in most any situation requiring a check valve for most any fluid. Moreover, it is understood that either the upper or the lower check valve could be used alone.

The double-check valve assembly 10 comprises a valve body 12 which is provided with threads 14 at a lower end thereof so as to be connectable to the inlet of a storage tank in the preferable application of the present invention. The valve body 12 is formed with a through bore 16 and further includes an upper external threaded portion 18 for connection to a supply source. In accordance with the use of the double-check valve assembly 10 for a LP gas tank, the threads at 18 are used for connection to a connector of a supply hose through which the LP gas is supplied (not shown).

Within the through bore 16, an internal threaded portion 20 (shown by broken lines) is provided which secures an upper sea ring 22 by external threads 24 thereon. An O-ring 26 is provided within a groove on the upper seat ring 22 for sealing the threaded connection between the upper seat ring 22 and the valve body 12. The internal upper edge of the upper seat ring 22 further includes a shaped surface 28 for accommodating a tool for rotating the upper seat ring 22 relative to the valve body 12. Preferably, the shaped surface 28 facilitates use of a hex key. A gasket 30 is further provided atop the upper seat ring 22 for assisting in sealing the valve body 12 to a supply hose or the like when a supply connection is made.

A double-check valve is mounted within the through bore 16 below the upper seat ring 22 and comprises an upper check valve 32, a lower check valve 34 and a valve guide 36. The valve guide 36, as best seen in FIGS. 3 and 5, includes a plurality of radially extending vanes 40 extending therefrom. Preferably, four such radially extending vanes 40 are provided. The valve guide 36 further includes a transverse pin 42, preferably made integral with the valve guide 36, onto which the lower check valve 34 is mounted in a manner as described below. A blind bore 44 is framed within the cylindrical central portion 38 which is open at the upper end of the valve guide 36, and is used for slidably guiding the upper check valve 32 therein.

Referring back to FIG. 1, the upper check valve 32 comprises a valve portion 46 and a stem portion 48. The valve portion 46 includes a surface at 50 which is positioned in FIG. 1 to sealably engage a seat face 52 provided at the lower portion of the internal surface of the upper seat ring 22. The surface 50 is preferably made of a resilient material. Moreover, the stem portion 48 is typically made of a metal material such as brass.

Figure 2:
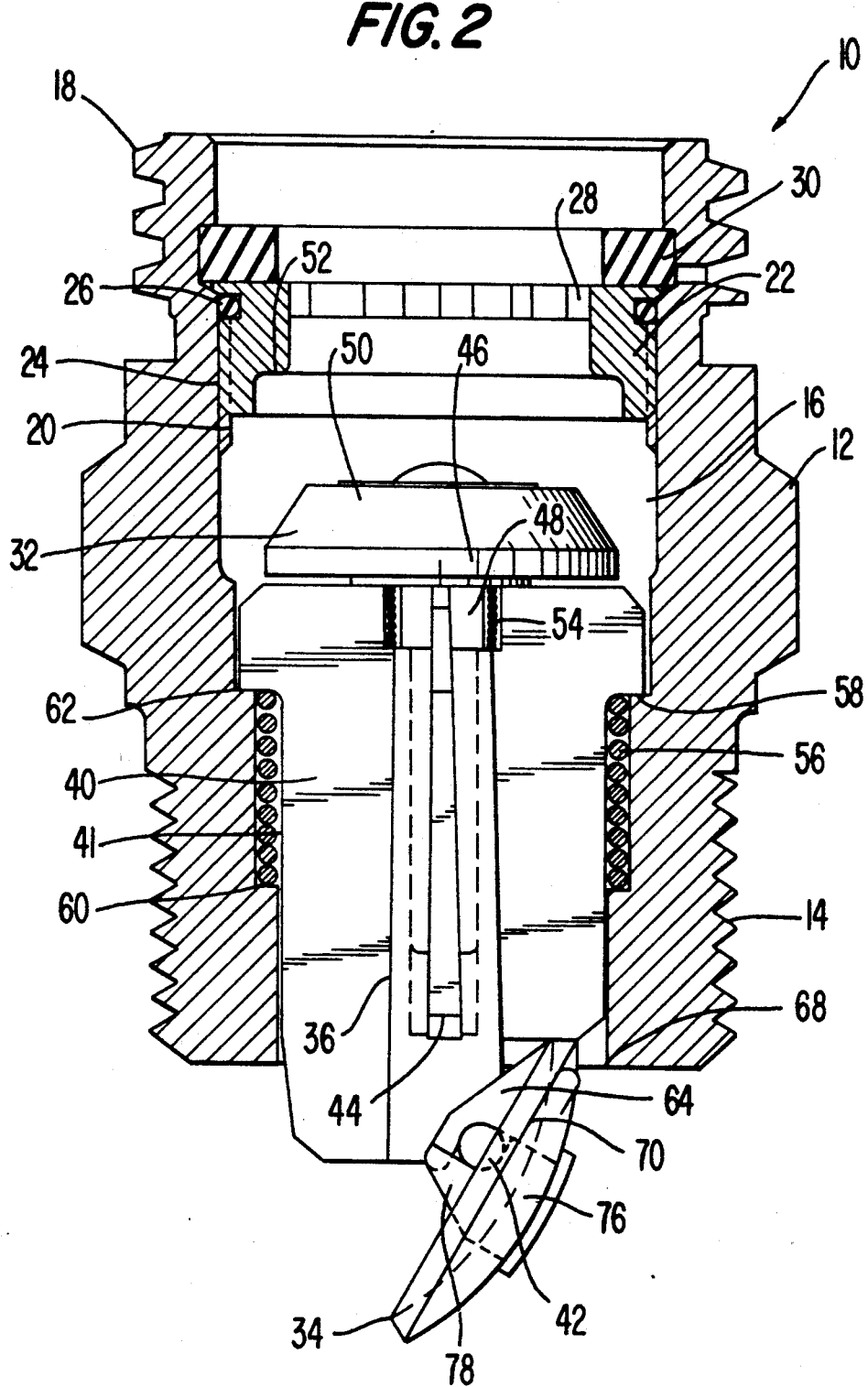
FIG. 2 is a partial cross sectional view of the double-check valve assembly, similar to FIG. 1, with the upper and lower check valves in their fully opened positions.
Figure 6:
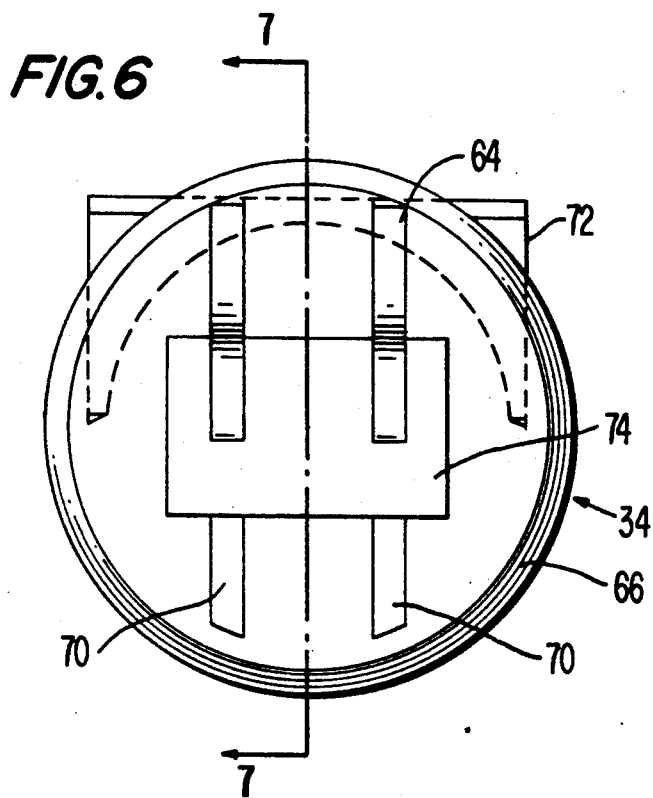
FIG. 6 is an enlarged plan view of the lower check valve of the present invention viewed from line 6—6 in FIG. 3.
Figure 7:
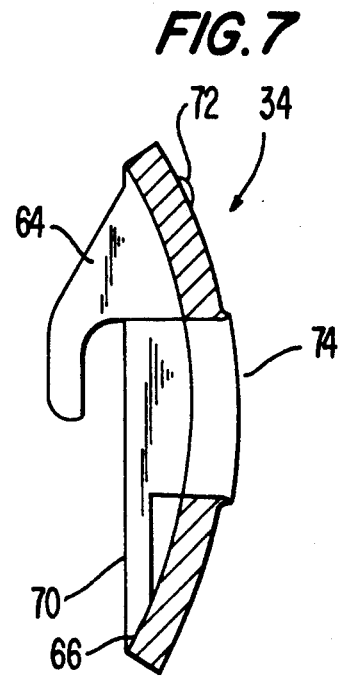
FIG. 7 is a cross sectional view taken along line 7—7 of FIG. 6.

As assembled, the stem portion 48 of the upper check valve 32 is inserted within the blind bore 44 of the valve guide 36. Furthermore, a first spring 54 is provided between a lower surface of the valve portion 46 and an upper edge of the valve guide 36 for biasing the upper check valve 32 into the position shown in FIG. 1 with surface 50 sealingly engaged with the seat face 52 of the upper seat ring 22. A second spring 56 is provided between a stop surface 58 on each of the vanes 40 and an annular step 60 on the inside surface of the valve body 12. This second spring 56 is also used to urge the valve guide 36 upward to the position shown in FIG. 1. In the lowermost position illustrated in FIG. 2, the stop surface 58 engages a second annular step 62 of the valve body 12 for limiting the downward travel. Note also that the outermost radial edges 41 of the vanes 40 guide the valve guide 36 against the lower portion of the through bore 16 as it moves between the uppermost and lowermost positions.

The lower check valve 34, as best seen in FIGS. 3, 4, 6 and 7, is mounted to the transverse pin 42 of the valve guide 36 by way of a pair of spaced pivot arms 64 extending outwardly from the top side of the lower check valve 34. A lower seat face is provided at 66 for sealingly engaging the lowermost inner edge of the valve body 12 at 68. A pair of ribs are also provided at 70 on the same side as the pivot arms 64 for reinforcing the lower check valve 34.

On the other side of the lower check valve 34, wing portions 72 are formed to engage the bottom surface of the valve body 12 as the lower check valve 34 is pivoted so as to cause downward movement of the valve guide 36 as the lower check valve 34 is pivoted under the influence of incoming fluid. When the lower check valve 34 pivots from its open to the closed position, the valve guide 36 moves upward under the influence of the second spring 56. This will be more clearly understood below in a description of the operation of the device.

The lower check valve 34 is further provided with an opening at 74 at the central portion thereof. This opening 74 receives a locking key 76 which is inserted within the opening 74 once the pivot arms 64 are hooked about the transverse pin 42 during assembly. Thus, a pair of lock arms 78 with the pivot arms 64 fully encircle the transverse pin 42 at both ends thereof for securely mounting the lower check valve 34 to the valve guide 36. After the locking key 76 is inserted and the transverse pin 42 is encircled, the locking key 76 is sealingly attached to the lower surface of the lower check valve 34 at the underside of the base portion 80 of the locking key 76 by any conventional means. Such conventional means can include adhesives or the like, and preferably is done by ultrasonic welding.

In operation of the double-check valve assembly 10, reference is made to the valve state illustrated in FIG. 1. In this closed state, the upper check valve 32 is held against the seat face 52 of the upper seat ring 22 thereby preventing the flow of the fluid into the valve from an external source. The upper check valve 32 is urged into this position by first spring 54. The lower check valve 34 is also in its closed position with lower seat face 66 sealingly engaged with the seat 68 of the valve body 12. In this regard, the lower check valve 34 is maintained in place by the valve guide 36 as biased upwardly by the second spring 56.

When the valve body 12 is connected to a pressurized fluid supply, the pressurized fluid enters the upper end of the valve body 12, passes through the upper seat ring 22 and initially opens the upper check valve 32 when the pressure of the fluid supply exceeds the bias force of the first spring 54. At this point, the upper check valve 32 begins movement toward the position illustrated in FIG. 2 and fluid flows between the upper check valve 32 and upper seat ring 22. Then as the fluid pressure acts against the lower check valve 34, the pressure will cause pivotal movement of the lower check valve 34 around the transverse pin 42 of the valve guide 36, and the wing portions 72 act on the lower surface of the valve body 12 to thus pull the valve guide 36 downwardly against the bias of the second spring 56 as the lower check valve 34 pivots. Thus, it can be seen that it is necessary for the fluid pressure to overcome the bias of the second spring 56 in order to open the lower check valve 34. Also note that since the lower check valve 34 is mounted about the eccentrically located transverse pin 42, the lower check valve 34 will assume a position closer to one side of the valve body 12 in the fully open position, and the downward travel of the valve guide 36 is limited by the engagement between stop surface 58 and the annular step 62. During this orientation, pressurized fluid supply is provided through the double-check valve assembly 10 into a storage tank (not shown).

The valve guide 36, lower check valve 34 and locking key 76 are preferably nylon. The construction of these elements from plastic allows the device to be inexpensively produced without requiring the additional machining operations associated with the prior art. It is, however, understood that other materials can be used for these parts and that plastic is preferable because it permits quick and inexpensive manufacture.

It can also be seen that the design of the present invention allows for easy servicing of the upper check valve 32 or the replacement of the upper check valve and the valve guide 36. By simply removing the upper seat ring 22, the double-check valve assembly can be accessed for repair and/or replacement.

Figure 8:
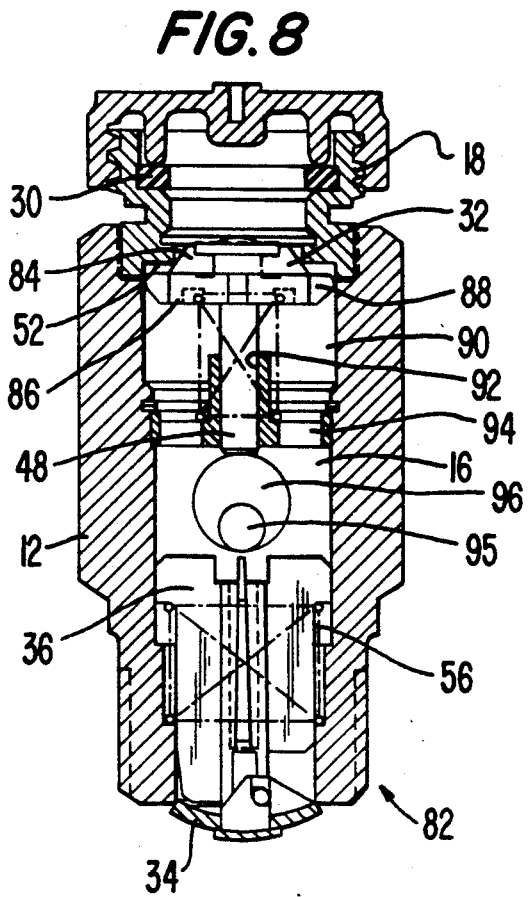
FIG. 8 is a partial cross section of a second embodiment of the double-check valve assembly of the present invention.
Figure 9:
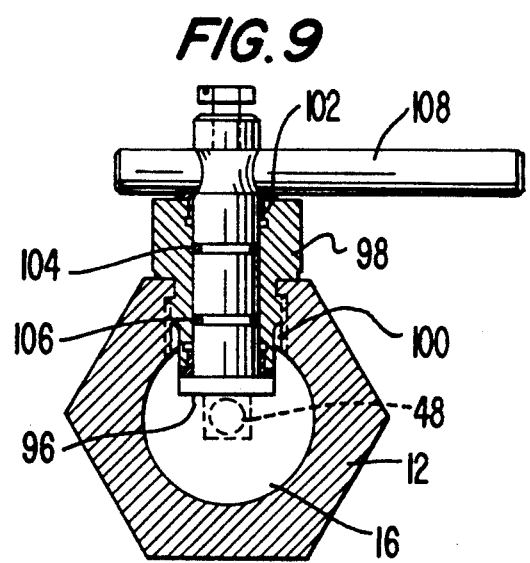
FIG. 9 is a partial sectional plan view of the double-check valve assembly of FIG. 8.

Referring now to FIGS. 8 and 9, a second embodiment of the double-check valve assembly of the present invention is indicated generally at 82. Basically, the structure of the double-check valve assembly 82 is substantially identical to that of the double-check valve 10, and consequently the same reference numerals will be used in FIGS. 8 and 9 for structures identical to those identified by these reference numerals in the previous figures. Only the upper portion of the double-check valve assembly 82 shown in FIG. 8 has been modified and the lower portion, including the lower check valve 34 and the lower portion of the valve guide 36, is identical in structure to that shown in FIGS. 1-7.

The upper check valve 32 for the double-check valve assembly 82 includes a sealing element 84 which seals against the seat face 52. This sealing element is mounted upon an annular support section 86 having openings 88 extending therethrough to permit fluid to pass to the lower check valve 34 when the upper check valve opens. The annular support section 86 slidably engages the inner surface of the through bore 16 in an enlarged upper section 90 thereof, and is attached to the stem portion 48. The stem portion is not received in the bore 44 of the valve guide 36 a previously described, but is instead slidably received in the bore 92 of a support spider 94 secured within the through bore 16. The stem portion is surrounded by the spring 54 which extends between the spider 94 and the support section 86.

The stem portion 48, at the lowermost extent of its travel, may be engaged by a pin 95 eccentrically mounted on the end of a shaft 96. The shaft 96 extends through a fitting 98 which is threaded into an opening 100 formed in the side of the valve body 12. The shaft is rotatably mounted in the fitting and is sealed thereto by seals 102, 104 and 106. A handle 108 is attached to the end of the shaft opposite to the end bearing the pin 95 and operates to rotate the shaft and the pin.

In operation, the handle 108 is normally positioned so that the pin 95 is oriented as shown in FIG. 8. This permits the check valve assembly 82 to operate in the manner previously described with respect to the check valve assembly 10. The pressure of incoming fluid first opens the upper check valve 32 moving the sealing element 84, the annular support section 86 and the stem portion 48 away from the seat face 52 against the bias of the spring 54. As fluid pressure acts against the lower check valve 34, the lower check valve pivots as previously described to pull the valve guide 36 downwardly against the bias of the spring 56. The pin 95 is positioned in FIG. 8 so as not to interfere with this normal operation of the double-check valve assembly 82.

In some cases, it has been found that when fluid pressure is removed from the double-check valve assembly 82, the lower check valve 34 will close, but the upper check valve 32 will have become jammed in the open position. When this occurs, the handle 108 is operated to turn the shaft 96 and pin 95 s that the pin engages and lifts the stem portion 48 to unjam the upper check valve and permit it to return to the closed and sealed position of FIG. 8.

What is claimed:

1. A check valve comprising:
   valve body means having an inlet and an outlet, said valve body means including a bore extending between said inlet and outlet to permit fluid flow therebetween; said bore being defined by a peripheral surface,
   valve means operative to selectively open or close said bore, said valve means including a first valve member operative to open said bore in response to fluid flow through said inlet, and a second valve member spaced from said first valve member and positioned between said first valve member and said inlet to open said bore in response to fluid flow through said inlet,
   valve guide means including spaced, radially extending vanes, which extend outwardly into contact with the peripheral surface of said bore for guiding and supporting said first valve member, said valve guide means being mounted for reciprocation within said bore and including a central portion having a guide bore extending axially thereof and pivot means for pivotally mounting said first valve member, said second valve member including a valve stem extending therefrom into said guide bore; and
   first bias means extending between said valve body and said valve guide means for biasing said valve guide means toward said inlet.

2. The check valve of claim 1 wherein an inlet valve seat means is provided on said valve body means within said bore between said second valve member and said inlet, said inlet valve seat means defining an inlet port which is closed by said second valve member in the absence of fluid flow through said inlet, the second valve member moving into said bore toward said outlet and away from said inlet valve seat means in response to fluid pressure from fluid flow through said inlet.

3. The check valve of claim 2 which includes second bias means extending between said valve guide means and said second valve member to bias said second valve member against said inlet valve seat means.

4. The check valve of claim 3 wherein said first valve member pivots about said pivot means to open said bore in response to fluid flow through said inlet valve seat means and said bore, said pivot means operating to position said first valve member to pivot about an axis eccentric to the central axis of said bore, said first valve member including means to contact said valve body means as said first valve member pivots about said pivot means to move said valve guide means toward said outlet against the bias of said first bias means.

5. The check valve of claim 4 wherein said first valve member includes locking means to mount said first valve member on said pivot means.

6. The check valve of claim 5 wherein said first valve member and said valve guide means are formed of plastic.

7. The check valve of claim 4 wherein said pivot means includes a transverse pin mounted on said valve guide means, said first valve member including a pair of spaced pivot arms having hook means formed thereon for receiving and engaging said pivot means, and lock means mounted on said first valve member and cooperating with said hook means to prevent removal of said first valve member from said transverse pin.

8. The check valve of claim 7 wherein said first valve member includes an opening formed therethrough, said lock means including a locking key formed to be inserted to close and seal said opening in said first valve member, said locking key including lock arm means which operate with said hook means to encompass said transverse pin when said locking key is received in the opening in said first valve member.

9. The check valve of claim 8 wherein an outlet valve seat means is provided on said valve body at the outlet thereof, said outlet valve seat means providing a seat for said first valve member to define a port, said first valve member being concentrically disposed against said outlet valve seat means to close said port in the absence of fluid flow through said bore, said transverse pin being eccentrically disposed relative to the center of said port.

10. The check valve of claim 9 wherein said valve body means includes a unitary valve body.

11. The check valve of claim 10 wherein said unitary valve body is provided with body stop means within said bore between said first and second valve members, said valve guide means being formed to contact said body stop means to limit the travel of said valve guide means within said bore.

12. The check valve of claim 11 wherein said inlet valve seat means is removably mounted within said bore.

13. The check valve of claim 12 wherein said valve guide means, first valve member and locking key are formed of plastic.

* * * * *